(12) United States Patent
Miura et al.

(10) Patent No.: US 10,035,247 B2
(45) Date of Patent: Jul. 31, 2018

(54) BOLT RETRIEVAL APPARATUS AND BOLT RETRIEVAL SYSTEM

(71) Applicant: TOYOTA JIDOSHA KABUSHIKI KAISHA, Toyota-shi (JP)

(72) Inventors: Kazuya Miura, Toyota (JP); Takashi Sagawa, Toyota (JP)

(73) Assignee: TOYOTA JIDOSHA KABUSHIKI KAISHI, Toyota-shi (JP)

( * ) Notice: Subject to any disclaimer, the term of this patent is extended or adjusted under 35 U.S.C. 154(b) by 197 days.

(21) Appl. No.: 15/139,824

(22) Filed: Apr. 27, 2016

(65) Prior Publication Data

US 2016/0311119 A1  Oct. 27, 2016

(30) Foreign Application Priority Data

Apr. 27, 2015  (JP) ................................ 2015-090118

(51) Int. Cl.
| | |
|---|---|
| *B25J 15/08* | (2006.01) |
| *B25B 23/10* | (2006.01) |
| *B23P 19/06* | (2006.01) |
| *B23P 19/00* | (2006.01) |

(52) U.S. Cl.
CPC .............. *B25B 23/10* (2013.01); *B23P 19/06* (2013.01); *B23P 19/066* (2013.01); *B25B 23/101* (2013.01); *B23P 19/006* (2013.01)

(58) Field of Classification Search
CPC ......... B25B 23/10; B25B 23/04; B25B 23/02; B23P 19/006; B23P 19/06
USPC ................. 29/280, 787, 788, 771, 798, 809; 227/136, 119, 138, 147
See application file for complete search history.

(56) References Cited

U.S. PATENT DOCUMENTS

| | | | | |
|---|---|---|---|---|
| 5,615,575 A | * | 4/1997 | Goodwin | ................ B23P 19/06 411/14 |
| 6,314,845 B1 | | 11/2001 | Wu | |
| 6,676,001 B1 | * | 1/2004 | Chen | ..................... B25B 23/045 227/119 |
| 6,701,812 B1 | * | 3/2004 | Sawamura | .............. B25B 23/10 81/452 |

(Continued)

FOREIGN PATENT DOCUMENTS

| | | |
|---|---|---|
| JP | 61-152341 A | 7/1986 |
| JP | 2000-269103 A | 9/2000 |

(Continued)

OTHER PUBLICATIONS

Extended European Search Report dated Oct. 6, 2016 in Patent Application No. 16166993.2.

*Primary Examiner* — Christopher M Koehler
*Assistant Examiner* — Mahdi H Nejad
(74) *Attorney, Agent, or Firm* — Oblon, McClelland, Maier & Neustadt, L.L.P.

(57) ABSTRACT

A retrieval apparatus for retrieving a bolt includes a guide including an opening that passes through the guide vertically, a first plate that includes a first end, a second plate that includes a second end, the first end and the second end being arranged facing each other so as to define an adjacent region, on an upper side of the opening. When the bolt is inserted from inside the opening toward the adjacent region, the first plate and the second plate abut against the bolt and pivot upwards, and the first end and the second end abut against a side surface of the bolt and grip the bolt.

6 Claims, 11 Drawing Sheets

(56) References Cited

U.S. PATENT DOCUMENTS

| | | | |
|---|---|---|---|
| 2003/0150897 A1* | 8/2003 | Ng | A61B 17/8891 227/147 |
| 2009/0038447 A1* | 2/2009 | McCracken | B25B 23/10 81/454 |
| 2009/0064828 A1* | 3/2009 | Fujioka | B23P 19/06 81/467 |
| 2012/0186405 A1* | 7/2012 | Ortiz | B25B 23/00 81/180.1 |
| 2015/0283683 A1* | 10/2015 | Ilzarbe Ripoll | B25B 23/10 81/451 |
| 2016/0311118 A1* | 10/2016 | Miura | B23P 19/006 |

FOREIGN PATENT DOCUMENTS

| | | | |
|---|---|---|---|
| JP | 2002-326180 A | | 11/2002 |
| JP | 2008-142873 | | 6/2006 |
| JP | 2008142873 A | * | 6/2008 |
| JP | 2013-166229 A | | 8/2013 |
| WO | WO 2010/029648 A1 | | 3/2010 |

* cited by examiner

BOLT RETRIEVAL APPARATUS AND BOLT RETRIEVAL SYSTEM

CROSS-REFERENCE TO RELATED APPLICATIONS

The present application claims the benefit of priority to Japanese Patent Application No. 2015-090118 filed on Apr. 27, 2015 with the Japan Patent Office, the entire contents of which are incorporated herein by reference in entirety.

BACKGROUND OF THE DISCLOSURE

1. Field of the Disclosure

This disclosure relates to a bolt retrieval apparatus and a bolt retrieval system.

2. Description of Related Art

In a vehicle assembly line and the like, there are times when a worker must squat down or bend over far to retrieve a bolt in a low position when assembling a vehicle. Such a posture places a strain on the worker. Therefore, in order to reduce the strain on the worker, a bolt retrieval apparatus that retrieves a bolt in a low position when assembling a vehicle is needed.

Japanese Patent Application Publication No. 2002-326180 (JP 2002-20 326180 A) describes a chuck apparatus that holds a workpiece by gripping the workpiece between a pair of elastically deformable chuck members that are arranged facing one another. With the chuck apparatus described in JP 2002-326180 A, each of the two chuck members is made to elastically curve and deform, and the work is held between the pair of chuck members using the elastic restoring force from the chuck members, which is generated by the deformation.

As described in the related art, in a vehicle assembly line and the like, a bolt retrieval apparatus that retrieves a bolt in a low position when assembling a vehicle is needed. When using the chuck apparatus described in JP 2002-326180 A as a bolt retrieval apparatus, for example, a bolt is gripped between the pair of elastically deformable chuck members that are arranged facing one another, and the bolt is held using friction force generated between the pair of chuck members and the bolt.

However, when a heavy member such as a bolt is gripped using the pair of chuck members, sufficient friction force may not be able to be produced between the pair of chuck members and the bolt, and as a result, the bolt that is held between the pair of chuck members may gradually slip out of position and fall.

SUMMARY

This disclosure thus provides a bolt retrieval apparatus and a bolt retrieval system capable of reliably retrieving a bolt.

A first aspect of the disclosure relates to a bolt retrieval apparatus for retrieving a bolt. The retrieval apparatus includes a guide including an opening that passes through the guide vertically, a first plate that includes a first end, and a second plate that includes a second end, the first end and the second end being arranged facing each other so as to define an adjacent region, on an upper side of the opening. When the bolt is inserted from inside the opening toward the adjacent region, the first plate and the second plate abut against the bolt and pivot upwards, and the first end and the second end abut against a side surface of the bolt and grip the bolt.

The bolt retrieval apparatus according to this aspect is configured to grip the bolt by the end of the first plate and the end of the second plate. Therefore, when the bolt tries to fall under its own weight, the end of the first plate and the end of the second plate catch on a groove of the bolt. Moreover, the force with which the first and second plates try to pivot downward is applied to the bolt, so the force with which the first and second plates grip the bolt becomes stronger. As a result, the bolt is able to be inhibited from falling at the time of bolt retrieval, so the bolt can be reliably retrieved.

In the first aspect, the retrieval apparatus may include a bolt storing structure that stores the bolt. The first end and the second end may, when a predetermined condition is satisfied, drop the bolt into the bolt storing structure by moving away from each other at least until a distance between the first end and the second end is greater than a diameter of the bolt.

In the above aspect, the bolt may be inserted into the adjacent region with a head of the bolt facing downward.

According to this aspect, a bolt is able to be dropped into a bolt storing structure and retrieved at a timing when a predetermined condition is satisfied.

A second aspect of the disclosure relates to a bolt retrieval system. The bolt retrieval system includes the retrieval apparatus according to the first aspect, and a removal device. The removal device includes a removing mechanism to remove the bolt from a predetermined member, and hold the bolt on a tip end of the removing mechanism, and a raising-and-lowering mechanism to raise and lower the removing mechanism. The raising-and-lowering mechanism inserts the bolt from inside the opening toward the adjacent region by raising the removing mechanism.

In the second aspect, the removing mechanism may hold the bolt with a head of the bolt facing downward.

In the second aspect, the removing mechanism may include a socket that fits together with a head of the bolt on the tip end of the removing mechanism. The socket may remove the bolt from the predetermined member by rotating while being fitted together with the head of the bolt.

According to the second aspect, a bolt held on a tip end of a removal mechanism of a dolly is able to be quickly and reliably retrieved using the bolt retrieval apparatus.

As described above, the aspects of the disclosure provide a bolt retrieval apparatus and a bolt retrieval system capable of reliably retrieving a bolt.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
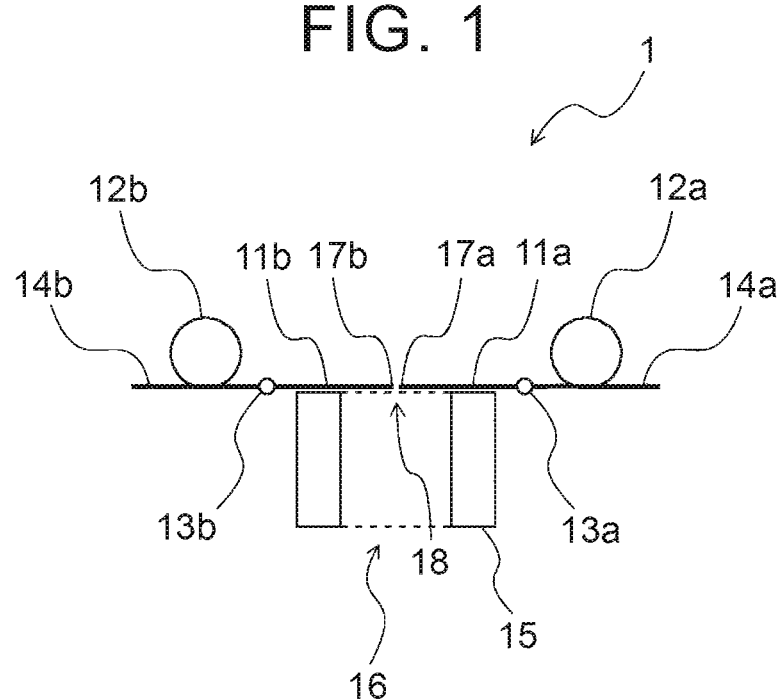
FIG. 1 is a sectional view of a bolt retrieval apparatus according to one example embodiment of the disclosure.
Figure 2:
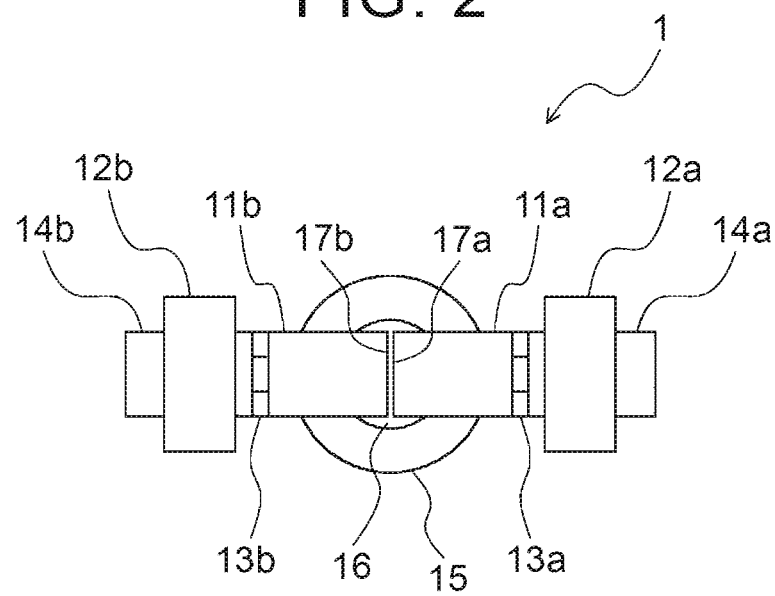
FIG. 2 is a plan view of the bolt retrieval apparatus according to the example embodiment.
Figure 3:
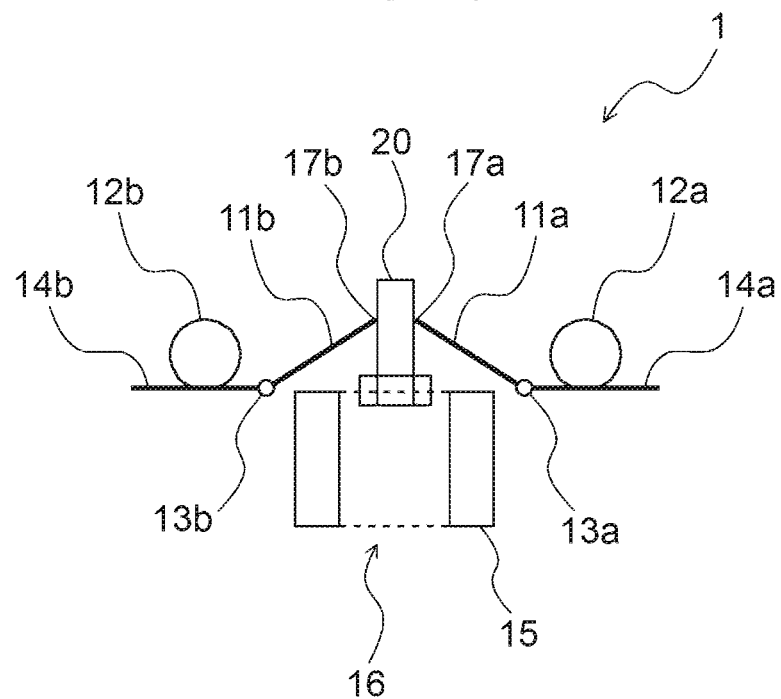
FIG. 3 is a sectional view of the bolt retrieval apparatus according to the example embodiment gripping a bolt.
Figure 4:
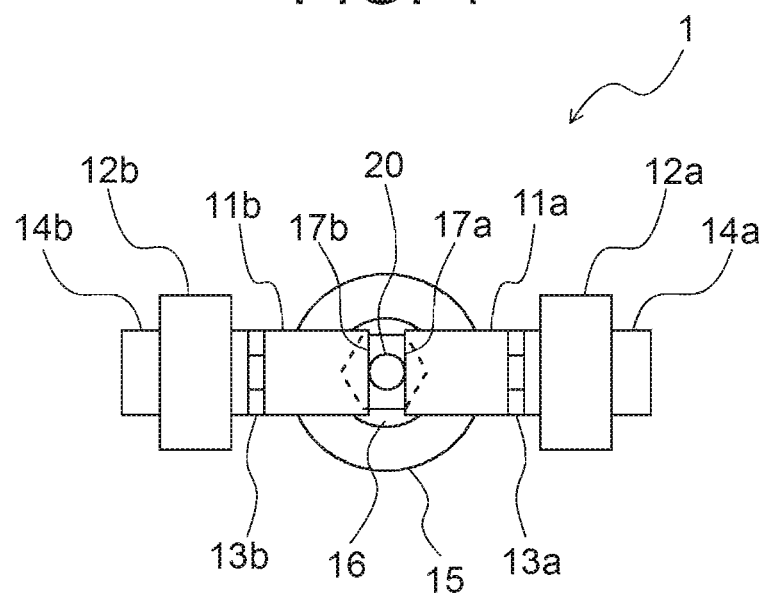
FIG. 4 is a plan view of the bolt retrieval apparatus according to the example embodiment gripping the bolt.

Hereinafter, example embodiments of the disclosure will be described with reference to the accompanying drawings. FIGS. 1 and 2 are a sectional view and a plan view, respectively, of a bolt retrieval apparatus according to one example embodiment. Also, FIGS. 3 and 4 are a sectional view and a plan view of the bolt retrieval apparatus of the example embodiment gripping a bolt. As shown in FIGS. 1 to 4, the bolt retrieval apparatus 1 according to the example embodiment includes plates 11a and 11b, supporting members 12a and 12b, connecting members 13a and 13b, plates 14a and 14b, and a guide member 15.

The plate 11a and the plate 14a are pivotally connected via the connecting member 13a. The plate 14a is fixed to the supporting member 12a. Similarly, the plate 11b and the plate 14b are pivotally connected via the connecting member 13b. The plate 14b is fixed to the supporting member 12b. The plate 11a and the plate 11b are arranged with an end portion 17a of the plate 11a and an end portion 17b of the plate 11b facing each other in an adjacent region 18, on an upper side of an opening 16 of the guide member 15. With the bolt retrieval apparatus 1 according to this example embodiment, a bolt 20 is held by the end portions 17a and 17b of the plates 11a and 11b, respectively (see FIGS. 3 and 4), so the plates 11a and 11b are arranged such that the distance between the end portion 17a and the end portion 17b is less than the diameter of the bolt 20. The bolt 20 has a shaft portion and a head portion. In this example embodiment, the diameter of the bolt 20 may be regarded as the diameter of a cross-section of the shaft portion of the bolt 20.

The guide member 15 has the opening 16 that passes through the guide member 15 vertically. When retrieving the bolt 20, the bolt 20 is inserted from inside the opening 16 of the guide member 15 toward the adjacent region 18. An upper surface of the guide member 15 abuts against lower surfaces of the plates 11a and 11b, thereby inhibiting the plates 11a and 11b from pivoting downward. For example, the plates 11a and 11b, the supporting members 12a and 12b, the connecting members 13a and 13b, the plates 14a and 14b, and the guide member 15 may all be formed using metal material.

Next, a state in which the bolt retrieval apparatus 1 grips the bolt 20 will be described with reference to FIGS. 3 and 4. When the bolt 20 is inserted from inside the opening 16 of the guide member 15 toward the adjacent region 18 (see FIG. 1), both the plate 11a and the plate 11b abut against the bolt 20 and pivot upward. Then, the end portion 17a of the plate 11a and the end portion 17b of the plate 11b abut against the side surface of the bolt 20, gripping the bolt 20. At this time, the supporting members 12a and 12b are both fixed such that the plates 14a and 14b do not move, so the plates 11a and 11b pivot upward about the connecting members (pivot axes) 13a and 13b.

Figure 5A:
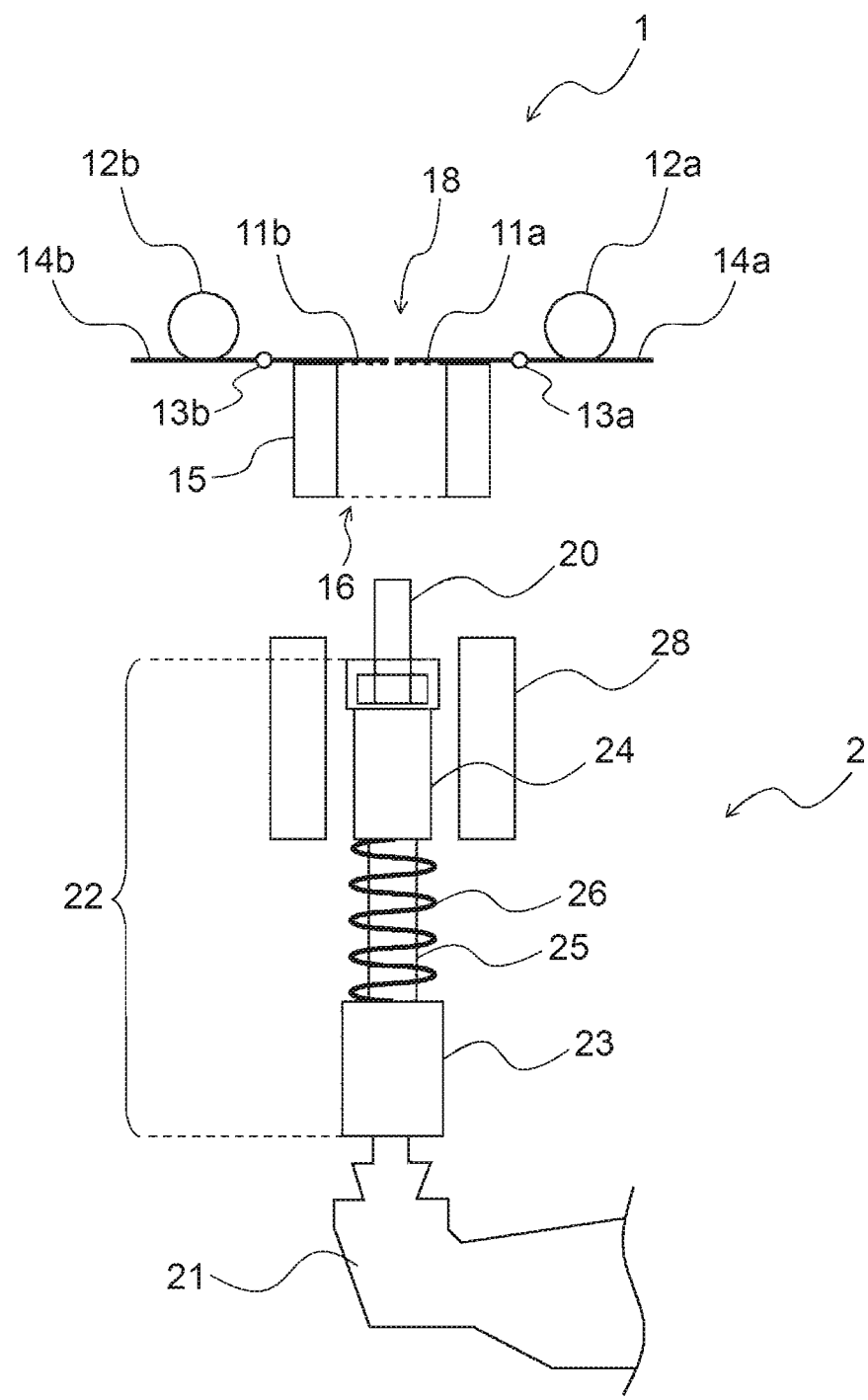
FIG. 5A is a sectional view illustrating an operation to retrieve the bolt using a bolt retrieval system according to the example embodiment.

Next, an operation to retrieve the bolt using a bolt retrieval system according to the example embodiment will be described with reference to FIGS. 5A to 5C. As shown in FIG. 5A, the bolt retrieval system according to this example embodiment includes the bolt retrieval apparatus 1 described above, and a removal device 2.

The removal device 2 is provided with a raising-and-lowering mechanism 21 and a removing mechanism 22. The raising-and-lowering mechanism 21 raises and lowers the removing mechanism 22 in the vertical direction. The removing mechanism 22 removes the bolt from a predetermined member. The removing mechanism 22 has a member 23, a socket 24, a shaft 25, and a spring 26. The member 23 and the socket 24 are connected via the shaft 25. Rotary torque from the raising-and-lowering mechanism 21 side is transmitted to the member 23. This rotary torque is transmitted from the member 23 to the socket 24 via the shaft 25.

Also, a guide member 28 is provided around the removing mechanism 22. This guide member 28 has an opening that passes through the guide member 28 vertically. The guide member 28 guides the removing mechanism 22 so that the removing mechanism 22 does not become laterally displaced when the removing mechanism 22 moves up and down within the opening of the guide member 28.

Also, when the removal device 2 removes a bolt from a predetermined member, a tip end of the socket 24 fits together with the head portion of the bolt that is attached to the predetermined member. Then, rotary torque is supplied from the raising-and-lowering mechanism 21 side to rotate the socket 24 and remove the bolt. As shown in FIG. 5A, the removed bolt 20 is held on the tip end of the removing mechanism 22, i.e., the tip end of the socket 24. For example, the bolt 20 is able to be reliably fixed to the tip end of the socket 24 by providing a magnet on the tip end of the socket 24.

Figure 5B:
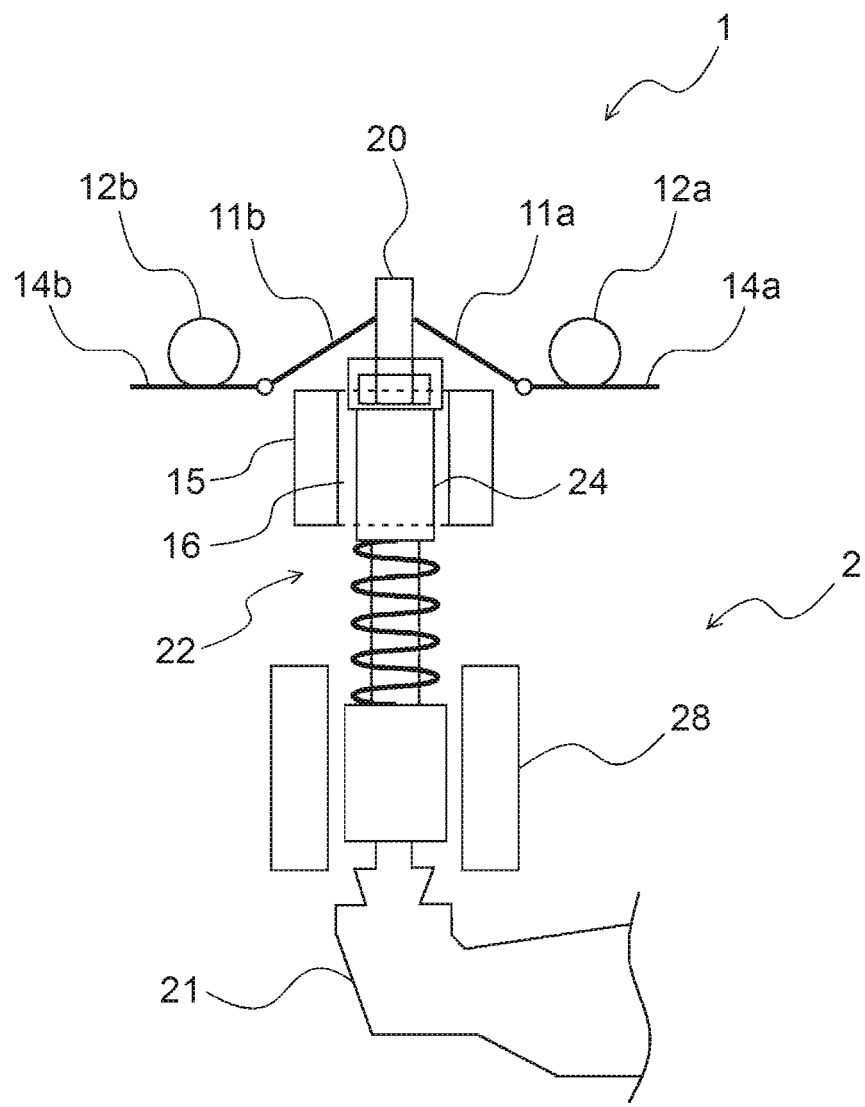
FIG. 5B is another sectional view illustrating the operation to retrieve the bolt using the bolt retrieval system according to the example embodiment.

When using the bolt retrieval apparatus 1 to retrieve the bolt 20 that has been removed in this way, the removing mechanism 22 is raised using the raising-and-lowering mechanism 21 of the removal device 2, as shown in FIG. 5B. As a result, the bolt 20 is inserted from the opening 16 side of the guide member 15 toward the adjacent region 18 (see FIG. 5A) that is between the plates 11a and 11b. When the bolt 20 is inserted from the opening 16 side of the guide member 15 toward the bolt 20 is inserted, both the plate 11a and the plate 11b abut against the bolt 20 and pivot upward.

Figure 5C:
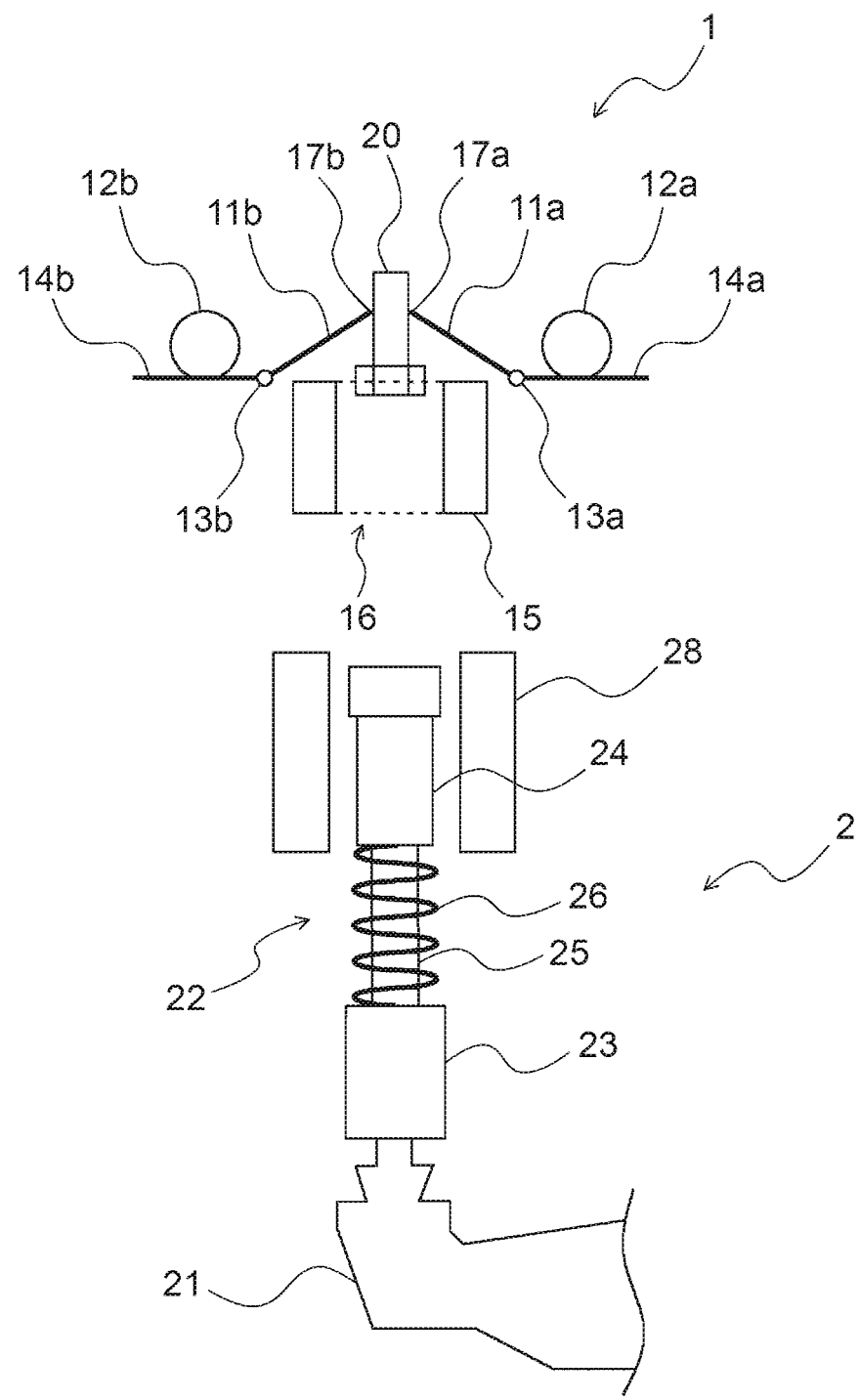
FIG. 5C is another sectional view illustrating the operation to retrieve the bolt using the bolt retrieval system according to the example embodiment.

Then, as shown in FIG. 5C, the removing mechanism 22 is lowered using the raising-and-lowering mechanism 21 of the removal device 2. At this time, the end portion 17a of the plate 11a and the end portion 17b of the plate 11b grip the bolt 20 by abutting against the side surface thereof, so the bolt 20 is retained.

In this way, the bolt retrieval apparatus 1 according to this example embodiment is configured to grip the bolt 20 by the end portion 17a of the plate 11a and the end portion 17b of the plate 11b. Therefore, when the bolt 20 tries to fall under its own weight, the end portion 17a of the plate 11a and the end portion 17b of the plate 11b catch on a groove of the bolt, and moreover, the force with which the plates 11a and 11b try to pivot downward is applied to the bolt 20, so the force with which the plates 11a and 11b grip the bolt 20 becomes stronger. As a result, the bolt 20 is able to be inhibited from falling at the time of bolt retrieval, so the bolt can be reliably retrieved.

Next, an operation in which the bolt retrieval apparatus 1 drops the bolt 20 will be described with reference to FIGS. 6A to 6C. The bolt retrieval apparatus 1 according to this example embodiment is configured to drop the retrieved bolt 20 into a bolt storing portion 30 when a predetermined condition is satisfied. As a result, the bolt 20 is able to be stored in the bolt storing portion 30 at a timing when the predetermined condition is satisfied. Also, the bolt retrieval apparatus 1 is again able to retrieve another bolt.

Figure 6A:
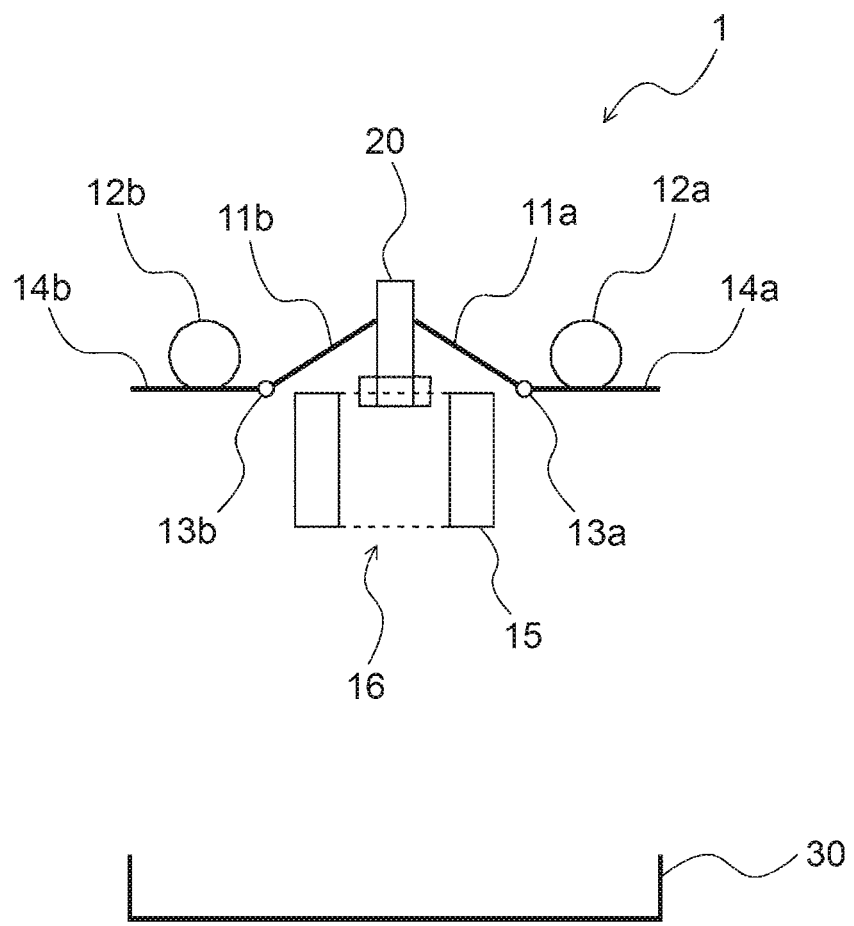
FIG. 6A is a sectional view illustrating an operation in which the bolt retrieval apparatus according to the example embodiment drops the bolt.
Figure 6B:
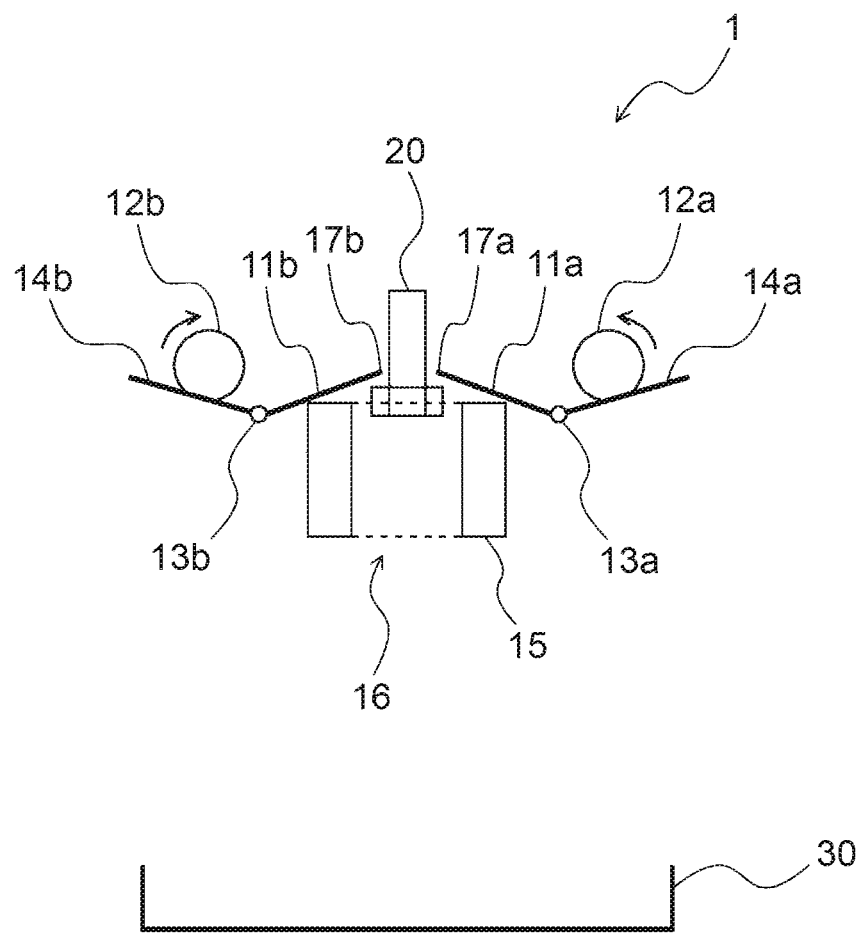
FIG. 6B is another sectional view illustrating the operation in which the bolt retrieval apparatus according to the example embodiment drops the bolt.
Figure 6C:
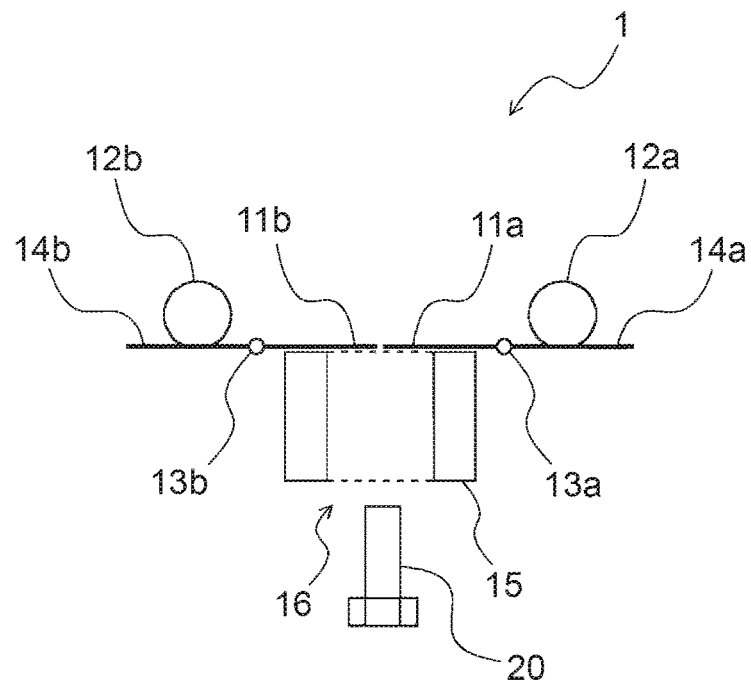
FIG. 6C is another sectional view illustrating the operation in which the bolt retrieval apparatus according to the example embodiment drops the bolt.

When dropping the bolt 20 that is gripped by the plate 11a and the plate 11b shown in FIG. 6A, the supporting members 12a and 12b both pivot in the direction indicated by the arrows in FIG. 6B, as shown in FIG. 6B. Here, the plates 14a and 14b are fixed to the supporting members 12a and 12b, respectively, so when the supporting members 12a and 12b pivot, the plates 14a and 14b are displaced. As a result, the connecting members 13a and 13b are displaced downward, and the plates 11a and 11b are also both displaced downward (see FIGS. 6A and 6B). Then, when the supporting members 12a and 12b pivot further, the lower surfaces of the plates 11a and 11b abut against the guide member 15, such that the distance between the end portion 17a of the plate 11a and the end portion 17b of the plate 11b becomes wider. Then when the distance between the end portion 17a of the plate 11a and the end portion 17b of the plate 11b becomes greater than the diameter of the bolt 20, the held bolt 20 drops into the bolt storing portion 30 (see FIG. 6C).

By the operation described above, the bolt retrieval apparatus 1 is able to retrieve (store) the held bolt 20 by dropping it into the bolt storing portion 30. This kind of operation is able to be performed when a predetermined condition is satisfied. The predetermined condition in this case may be set as appropriate.

For example, after the bolt 20 held by the removal device 2 shown in FIGS. 5A to 5C is gripped by the bolt retrieval apparatus 1, the bolt 20 may be dropped when the removal device 2 moves away from the bolt retrieval apparatus 1. Also, for example, a switch may be provided on the bolt retrieval apparatus 1, and the bolt 20 may be dropped when a worker pushes this switch. Also, for example, a timer may be provided in the bolt retrieval apparatus 1, and the bolt 20 may be automatically dropped when a predetermined period of time has passed after the bolt 20 is gripped by the bolt retrieval apparatus 1. Furthermore, the bolt 20 may be automatically dropped after a predetermined period of time has passed after the worker pushes the switch. The mechanism for pivoting the supporting members 12a and 12b when the removal device 2 moves away from the bolt retrieval apparatus 1, the mechanism for pivoting the supporting members 12a and 12b when the worker pushes the switch, and the mechanism for pivoting the supporting members 12a and 12b after the predetermined period of time has passed are all able to be formed using general technology, so a description of these will be omitted.

Next, an operation to retrieve the bolt using the bolt retrieval system according to this example embodiment will be described with reference to FIGS. 7A to 7H. FIGS. 7A to 7H are views illustrating, as an example, work that involves removing a lower support 43 that is attached to a front lower portion of a vehicle 41 using a bolt 44.

Figure 7A:
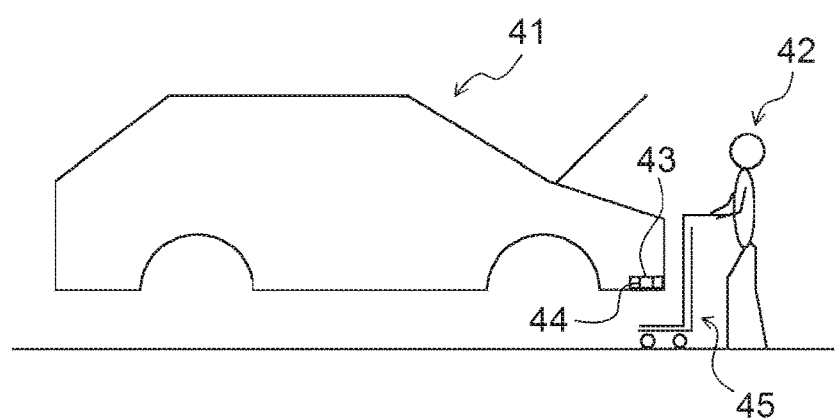
FIG. 7A is a view illustrating an operation to retrieve the bolt using the bolt retrieval system according to the example embodiment.
Figure 7B:
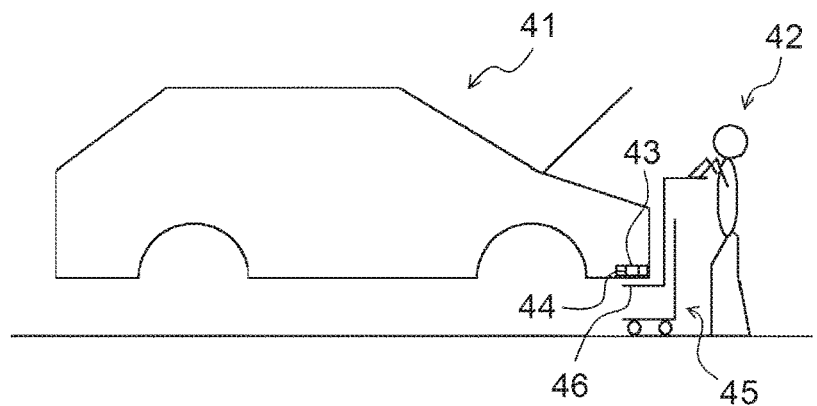
FIG. 7B is another view illustrating the operation to retrieve the bolt using the bolt retrieval system according to the example embodiment.
Figure 7C:
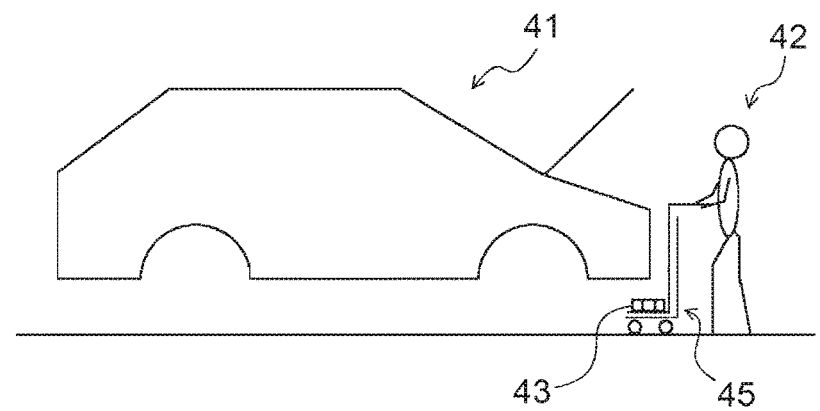
FIG. 7C is another view illustrating the operation to retrieve the bolt using the bolt retrieval system according to the example embodiment.
Figure 7D:
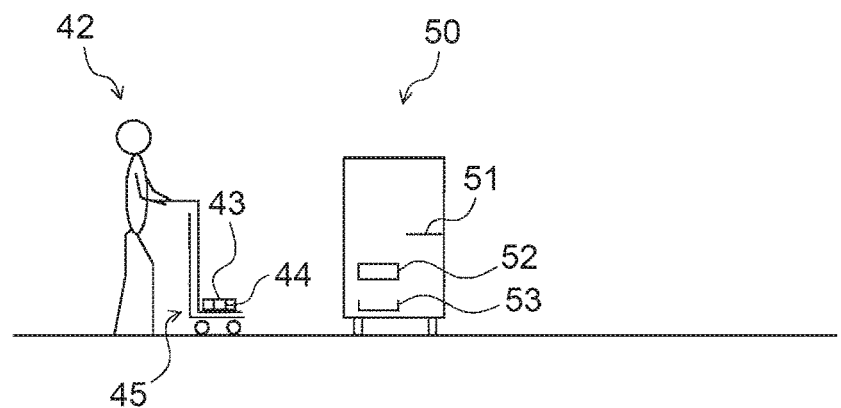
FIG. 7D is another view illustrating the operation to retrieve the bolt using the bolt retrieval system according to the example embodiment.

First a worker 42 arranges a dolly 45 below the lower support 43, as shown in FIG. 7A. Then, the worker 42 raises a nut runner 46 (corresponding to the removal device 2 in FIGS. 5A to 5C) that is carried on the dolly 45, and removes the bolt 44 that fixes the lower support 43 in place, as shown in FIG. 7B. In this example embodiment, the nut runner 46 is raised by the worker 42 lifting up a handle portion. As a result, the lower support 43 and the bolt 44 are removed from the vehicle 41. Then, the worker 42 lowers the nut runner 46, as shown in FIG. 7C. At this time, the removed bolt 44 is held on the tip end of the socket 24 of the nut runner 46 (see FIG. 5A). Also, the removed lower support 43 is placed on a receiving portion of the dolly 45.

Figure 7E:
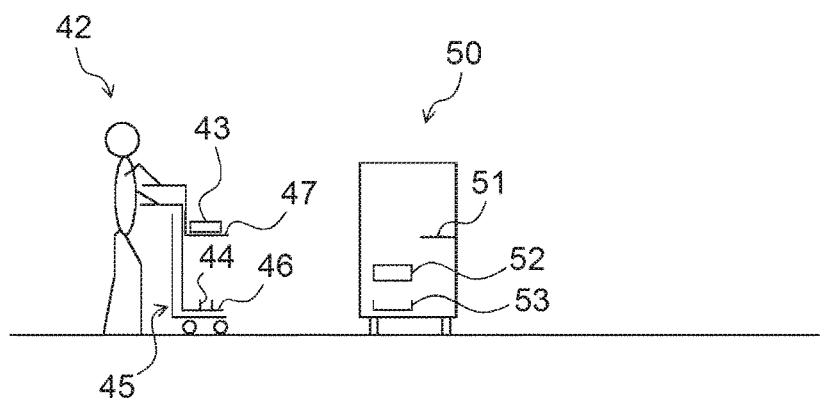
FIG. 7E is another view illustrating the operation to retrieve the bolt using the bolt retrieval system according to the example embodiment.
Figure 7F:
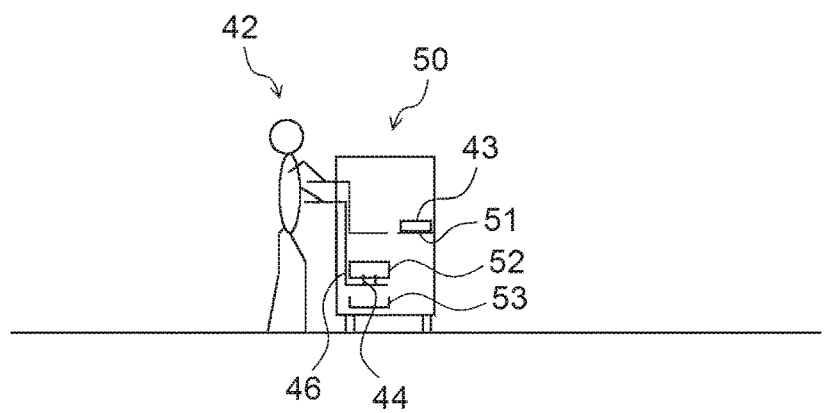
FIG. 7F is another view illustrating the operation to retrieve the bolt using the bolt retrieval system according to the example embodiment.
Figure 7G:
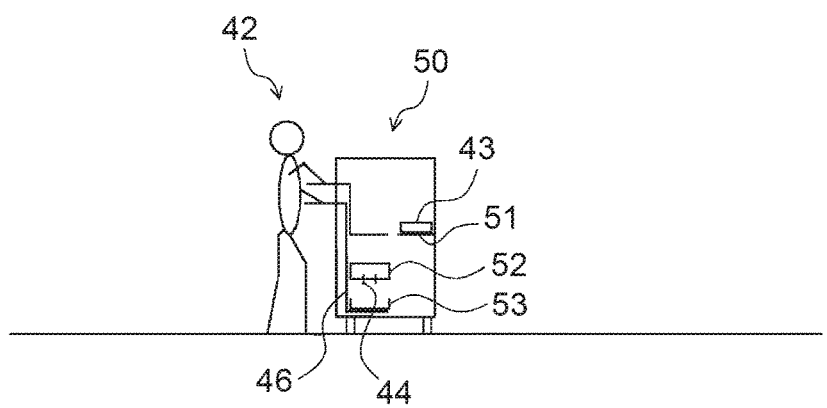
FIG. 7G is another view illustrating the operation to retrieve the bolt using the bolt retrieval system according to the example embodiment.

The worker 42 then moves the dolly 45 loaded with the lower support 43 and the bolt 44 to a retrieval cart 50. In this case, the retrieval cart 50 has a retrieval shelf 51 for retrieving the lower support 43, a bolt retrieval apparatus 52 (corresponding to the bolt retrieval apparatus 1 in FIGS. 5A to 5C), and a bolt storing portion 53 (corresponding to the bolt storing portion 30 in FIGS. 6A to 6C). Then, the worker 42 raises a receiving portion 47 on which the lower support 43 is placed, as shown in FIG. 7E. Next, the worker 42 moves the lower support 43 that is placed on the receiving portion 47 to the retrieval shelf 51 of the retrieval cart 50, as shown in FIG. 7F. Also, the worker 42 raises the nut runner 46 and inserts the removed bolt 44 into the bolt retrieval apparatus 52. Then, the worker 42 lowers the nut runner 46, as shown in FIG. 7G. With this operation, the bolt 44 is held by the bolt retrieval apparatus 52. The operation of holding the bolt 44 with the bolt retrieval apparatus 52 is similar to the operation described with reference to FIGS. 5A to 5C.

Figure 7H:
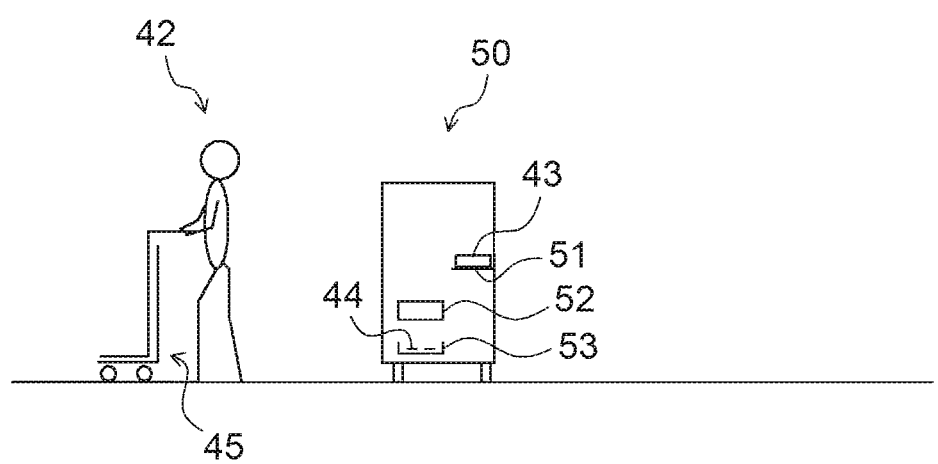
FIG. 7H is another view illustrating the operation to retrieve the bolt using the bolt retrieval system according to the example embodiment.

Then, when the dolly 45 moves away from the retrieval cart 50, the bolt 44 held by the bolt retrieval apparatus 52 is dropped into the bolt storing portion 53, as shown in FIG. 7H. With this kind of operation, after the lower support 43 and the bolt 44 that had been attached to the vehicle 41 have been removed, the removed lower support 43 and bolt 44 are able to be moved to the retrieval cart 50. After moving the lower support 43 and the bolt 44 to the retrieval cart 50, the worker 42 repeats the work of retrieving the lower support and bolt from the next vehicle. Also, the lower support 43 that is placed on the retrieval shelf 51 of the retrieval cart 50 is moved to a line-side shooter. Also, the bolt stored in the bolt storing portion 53 is moved to another container when the amount of bolts that are stored becomes greater than a predetermined amount.

In this way, using the bolt retrieval system according to the example embodiment enables a bolt in a low position to be retrieved without placing a strain on a worker when assembling a vehicle.

While example embodiments of the disclosure have been described, the disclosure is not limited to only the structures of the example embodiments. That is, the disclosure naturally includes various modifications, improvements, and combinations possible by one skilled in the art within the scope of the disclosure.

What is claimed is:

1. A retrieval apparatus for retrieving a bolt, the retrieval apparatus comprising:
    a guide including an opening that passes through the guide vertically;
    a first plate that includes a first end and a third end that is located on an opposite side to the first end; and
    a second plate that includes a second end and a fourth end that is located on an opposite side to the second end, the first end and the second end being arranged facing each other so as to define an adjacent region on an upper side of the opening, and the third end and the fourth end are horizontally spaced apart from the adjacent region, wherein
    when the bolt is inserted from inside the opening toward the adjacent region,
        the first plate and the second plate abut against the bolt and pivot upwards, and
        the first end and the second end abut against a side surface of the bolt and grip the bolt, and
    in a state where the first plate and the second plate are gripping the bolt, the third end of the first plate and the fourth end of the second plate are displaced downward, by bringing lower surfaces of the first plate and the second plate into contact with the guide, so that the first end and the second end are separated from each other by at least a distance larger than a diameter of the bolt to drop the bolt.

2. The retrieval apparatus according to claim 1, further comprising:
    a bolt storing structure that stores the bolt, wherein
    the first end and the second end, when a predetermined condition is satisfied, drop the bolt into the bolt storing structure by moving away from each other at least until the distance between the first end and the second end is greater than the diameter of the bolt.

3. The retrieval apparatus according to claim 2, wherein the bolt is inserted into the adjacent region with a head of the bolt facing downward.

4. A bolt retrieval system comprising:
    the retrieval apparatus according to claim 1; and
    a removal device, including
        a removing mechanism to remove the bolt from a predetermined member, and hold the bolt on a tip end of the removing mechanism, and
        a raising-and-lowering mechanism to raise and lower the removing mechanism, and the raising-and-lowering mechanism inserts the bolt from inside the opening toward the adjacent region by raising the removing mechanism.

5. The bolt retrieval system according to claim 4, wherein the removing mechanism holds the bolt with a head of the bolt facing downward.

6. The bolt retrieval system according to claim 4, wherein the removing mechanism includes a socket that fits together with a head of the bolt on the tip end of the removing mechanism, and the socket removes the bolt from the predetermined member by rotating while being fitted together with the head of the bolt.

* * * * *